(12) United States Patent
Milacic

(10) Patent No.: US 9,685,667 B2
(45) Date of Patent: Jun. 20, 2017

(54) METHODS FOR TESTING ANODE INTEGRITY DURING FUEL CELL VEHICLE OPERATION

(71) Applicant: Ford Global Technologies, LLC, Dearborn, MI (US)

(72) Inventor: Milos Milacic, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 380 days.

(21) Appl. No.: 14/453,583

(22) Filed: Aug. 6, 2014

(65) Prior Publication Data

US 2016/0043414 A1    Feb. 11, 2016

(51) Int. Cl.
| | | |
|---|---|---|
| H01M 8/04 | (2016.01) | |
| H01M 8/04089 | (2016.01) | |
| H01M 16/00 | (2006.01) | |
| H01M 8/04828 | (2016.01) | |
| H01M 8/04537 | (2016.01) | |
| H01M 8/04664 | (2016.01) | |
| H01M 8/043 | (2016.01) | |

(52) U.S. Cl.
CPC ....... *H01M 8/04104* (2013.01); *H01M 8/043* (2016.02); *H01M 8/0494* (2013.01); *H01M 8/04604* (2013.01); *H01M 8/04679* (2013.01); *H01M 16/006* (2013.01); *H01M 2250/20* (2013.01); *Y02T 90/32* (2013.01)

(58) Field of Classification Search
CPC ...................................................... H01M 8/04
See application file for complete search history.

(56) References Cited

U.S. PATENT DOCUMENTS

| | | | |
|---|---|---|---|
| 7,942,035 B2 | 5/2011 | Booden et al. | |
| 8,158,297 B2 | 4/2012 | Ishikawa | |
| 8,343,679 B2 | 1/2013 | Bono | |
| 8,349,509 B2 | 1/2013 | Yoshida | |
| 8,387,441 B2 | 3/2013 | Falta et al. | |
| 8,524,405 B2 | 9/2013 | Salvador et al. | |
| 8,563,191 B2 | 10/2013 | Katano et al. | |
| 2008/0141760 A1 | 6/2008 | Sienkowski et al. | |
| 2010/0227240 A1* | 9/2010 | Manabe | B60L 11/1885 429/442 |

(Continued)

FOREIGN PATENT DOCUMENTS

DE     102009008654 A1    8/2010

OTHER PUBLICATIONS

Anonymous, "Equivalent circuit modeling method and parameterizaiton for batteries," IPCOM No. 000170320, Published May 15, 2008, 3 pages.

(Continued)

*Primary Examiner* — Jacob Marks
(74) *Attorney, Agent, or Firm* — Damian Porcari; McCoy Russell LLP

(57) ABSTRACT

A system and methods are provided for testing anode integrity during vehicle operation. In one particular example, the system and methods allow for anode leak tests during vehicle operation by temporarily reducing fuel cell power while supplementing the fuel cell power reduction with battery power to meet operating demands. In this way, an anode leak test can be performed even during highway driving when operating demands may be particularly high.

20 Claims, 9 Drawing Sheets

(56) References Cited

U.S. PATENT DOCUMENTS

2013/0017465 A1   1/2013   Harris et al.

OTHER PUBLICATIONS

Anonymous, "Multilayer Current Collector Design for Integrated Parallel Battery and Capacitor Energy Storage Device," IPCOM No. 000225043, Published Jan. 22, 2013, 2 pages.
Ingimundarson, A. et al., "Model-based Detection of Hydrogen Leaks in a Fuel Cell Stack," Control Systems Technology, IEEE Transactions on, vol. 16, Iss. 5, pp. 1004-1012, Sep. 2008, 6 pages.
Milacic, Milos et al., "Methods for Determining Anode Integrity During Fuel Cell Vehicle Operation," U.S. Appl. No. 14/568,994, filed Dec. 12, 2014, 49 pages.

* cited by examiner

METHODS FOR TESTING ANODE INTEGRITY DURING FUEL CELL VEHICLE OPERATION

FIELD

The present description relates to systems and methods for performing anode leak tests in hydrogen fuel cells vehicles.

BACKGROUND AND SUMMARY

Hydrogen may be used as a fuel source for fuel cells joined together to form a fuel cell stack. In the fuel cell stack, hydrogen is presented on the anode side whereas air is presented on the cathode side. The fuel cell stack generates electrical current in response to the electrochemical conversion of hydrogen and oxygen into water, which may then be used to drive various devices onboard the vehicle in addition to the vehicle itself.

One approach detecting hydrogen leaks on the anode side of the fuel cell stack is based on dropping vehicle power requests without supplementing power to the vehicle in order to perform the anode leak test (ALT). For example, U.S. Pat. No. 8,524,405 discloses conducting an anode leak test during a vehicle shutdown process when the power requested by the vehicle is already undergoing power reduction. As another example, DE 102009008654 or U.S. Pat. No. 7,942,035 conducts a leak test in a fuel cell vehicle only when a zero-load requirement is satisfied. In still another example, U.S. Pat. No. 8,349,509 discloses performing an anode leak test at vehicle startup and intermittently during operation, but fails to supplement the electrical power during test performance.

The inventors herein have recognized the above issues as well as that lacking an alternative energy source, anode leak tests may be limited to performance at low fuel cell powers, and performed during vehicle idle conditions. As such, infrequent checking for hydrogen leaks may occur in the anode of the fuel cell stack.

In one example, a method is provided for performing an anode leak test during vehicle operation, for example, when the vehicle is being driven. In one particular example, the method comprises temporarily reducing fuel cell power below a requested fuel cell power; supplementing the fuel cell power reduction with battery power; and performing the anode leak test during the temporarily reduced fuel cell power. Moreover, by using an alternative energy source to supplement the fuel cell power, the leak detection method can be triggered based on one or more operating conditions like a driving profile, a state of system control, a temperature, and/or an engine load (e.g., a vehicle speed). In this way, the technical result can be achieved that conductance of the anode leak test may be performed more frequently and during vehicle operation, for example, while the vehicle driving in motion on the road.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
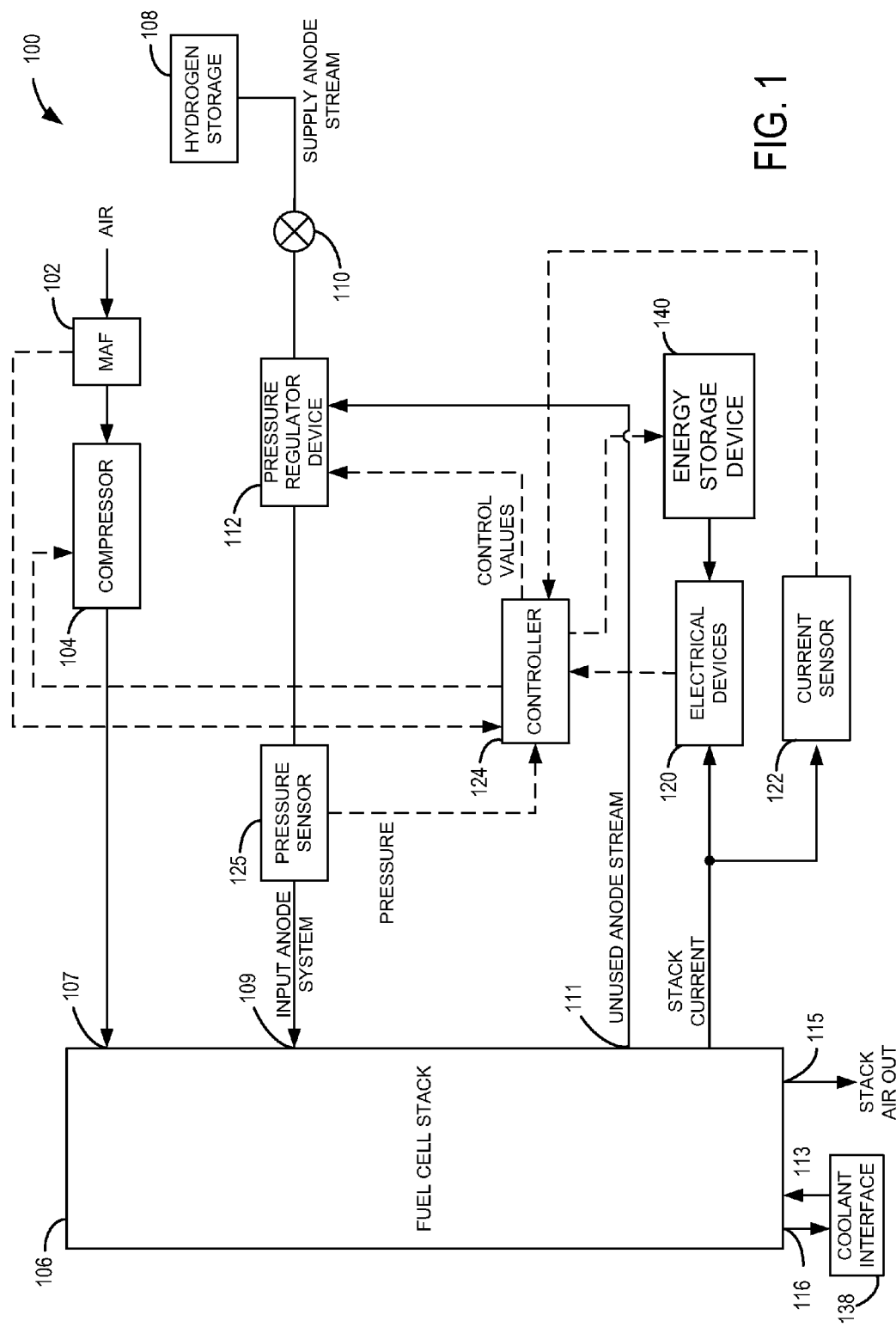
FIG. 1 illustrates an exemplary fuel cell stack system in accordance with one embodiment of the present description.

The following description relates to a method for detecting anode leaks in a hydrogen fuel cell system during vehicle operation. In one particular embodiment, the system disclosed may be used in a hybrid fuel cell vehicle propulsion system with an electric generator/motor and a hydrogen fuel cell stack system. As such, FIG. 1 illustrates an exemplary fuel cell stack system in accordance with one embodiment of the present description. Then, FIGS. 2-5 illustrate example routines and operating sequences configured to temporarily reduce a fuel cell power below a requested fuel cell power, supplement the fuel cell power reduction with battery power, and perform the anode leak test during the temporarily reduced fuel cell power. FIGS. 6-9 illustrate example anode leak tests that may be performed during the operating state wherein the fuel cell power is temporarily reduced.

FIG. 1 illustrates an exemplary fuel cell recirculating system 100 in accordance with one embodiment of the present description. The system 100 may be implemented in hybrid fuel cell based electric vehicles or any other such apparatus that uses electrical current generated by a hydrogen fuel cell to drive various devices while also having an alternative energy source to supplement vehicle power when fuel cell power is reduced during leak detection testing.

A first fluid stream (or cathode stream) which comprises of air is fed to a mass air flow (MAF) sensor 102. The air passing through the MAF sensor 102 is atmospheric air. The MAF sensor 102 measures the amount of flow of air in the fluid stream. An air compressor 104 pressurizes the air stream and delivers the air stream to a fuel cell stack 106. The fuel cell stack 106 includes a first inlet 107 for receiving the air stream. A humidifier (not shown) may be added to the system 100 to add water vapor into the air stream. If the air includes a high water content, a humidity sensor (not shown) may be included to measure the wet air. The water may be used to ensure that membranes (not shown) in the fuel cell stack 106 remain humidified to provide for optimal operation of the fuel cell stack 106.

A tank (or supply) 108 presents a supply fuel stream (or an anode stream) in the form of hydrogen. The supply anode stream comprises compressed hydrogen. While compressed hydrogen may be used in the system 100, any hydrogen fuel source may be implemented in the system 100. For example, liquid hydrogen, hydrogen stored in various chemicals such as sodium borohydride or alanates, or hydrogen stored in metal hydrids may be used instead of compressed gas.

A tank valve 110 controls the flow of the supply hydrogen. A pressure regulator device 112 regulates the flow of the supply hydrogen. The pressure regulator device 112 may include any type of device used to control the pressure or flow rate of a fluid. For example, the pressure regulator device 112 may be implemented as a pressure regulator or as a variable or multistage ejector. The pressure regulator device 112 is configured to combine the supply anode stream (e.g., hydrogen received from the tank 108) with an unused anode stream (e.g., recirculated hydrogen from the fuel cell stack 106) to generate an input anode stream (or stack hydrogen). A humidifier (not shown) may be provided to add water vapor to the input anode stream. Humidified water vapor in the input anode stream may be included to ensure that the membranes in the fuel cell stack 106 remain humidified to provide for optimal operation of the fuel cell stack 106.

The pressure regulator device 112 controls the flow of the input anode stream to the fuel cell stack 106. The fuel cell stack 106 includes a second inlet 109 that is adapted to receive the input anode stream from the pressure regulator device 112. The fuel cell stack 106 generates stack current in response to electrochemically converting the hydrogen from the input anode stream and oxygen from air in the first fluid stream.

Various electrical devices 120 are coupled to the fuel cell stack 106 to consume such power in order to operate. If the system 100 is used in connection with a vehicle, the devices 120 may include a motor or a plurality of vehicle electrical components that each consume power to function for a particular purpose. For example, such devices 120 may be associated with and not limited to a vehicle powertrain, occupant heating and cooling, interior/exterior lighting, entertainment devices, and power locking windows. The particular types of devices 120 implemented in the vehicle may vary based on vehicle content, the type of motor used, and the particular type of fuel cell stack implemented. A current sensor 122 measures the stack current generated by fuel cell stack 106. The current sensor 122 transmits measured current readings to a controller 124. The controller 124 transmits control values to the pressure regulator device 112 to control the flow of the input anode stream to the fuel cell stack 106. A pressure sensor 125 is coupled between the pressure regulator device 112 and the fuel cell stack 106 to measure the pressure of the hydrogen prior to the hydrogen being delivered to the fuel cell stack 106. The pressure sensor 125 transmits a feedback signal (e.g., PRESSURE) which is indicative of the pressure of hydrogen in the input anode stream.

Excess amounts of air and hydrogen are delivered to the fuel cell stack 106 to increase operational robustness of the fuel cell stack 106. The fuel cell stack may discharge unused hydrogen in the unused anode stream. An outlet 111 of the fuel cell stack 106 is adapted to discharge the unused anode stream. The unused anode stream may include various impurities such as nitrogen and water both in liquid and vapor form in addition to hydrogen.

The fuel cell stack 106 includes an outlet 115 that is configured to discharge excess air. The fuel cell stack 106 includes outlet 116 that is adapted to present coolant in the form of de-ionized water ethylene glycol (DIWEG) or other suitable coolant in response to the heat generated due to the chemical processing of hydrogen and oxygen (e.g., from the air stream). A cooling interface 138 may receive the DIWEG from the fuel cell stack 106. The cooling interface 138 may also provide stack coolant to an inlet 113 of the fuel cell stack 106.

The pressure regulator device 112 is adapted to increase or decrease the pressure of the input anode stream to the stack 106 in response to control values transmitted by the controller 124. The pressure regulator device 112 is adapted to receive the supply anode stream at a constant pressure from the tank valve 110. The pressure regulator device 112 may receive the unused anode stream from the fuel cell stack 106 (or a purging arrangement not shown) at varying flow rates.

As noted above, the pressure regulator device 112 may be implemented as any pressure regulating device that is generally known in the art. Generally speaking, such pressure regulating devices adjust the pressure of a fluid in response to control values (or signals) having various electrical based characteristics. Such characteristics may include pulse width modulated (PWM) values, analog values or digital values depending on the particular type of pressure regulating device implemented. In one example, the pressure regulator device 112 may be implemented as a pulsing valve. The controller 124 may transmit control values as PWM based values for controlling the pressure regulator to increase or decrease the flow rate of input anode stream to the fuel cell stack 106. In another example, the pressure regulator device 112 may be implemented as an ejector. The ejector may be implemented with a solenoid controlled needle actuator (not shown). Such a solenoid controlled needle actuator is disclosed in U.S. patent application Ser. No. 11/830,898, entitled "System and Method for Recirculating Unused Fuel in Fuel Cell Application", to Brighton et al., which is hereby incorporated by reference in its entirety. The solenoid may move the needle in the ejector in response to the control values being analog thereby allowing for an increase or decrease of the pressure of input anode stream presented to the fuel cell stack 106. The movement of the needle is variable in nature to allow for different flow rates of the unused anode stream to be combined with the supply anode stream from the tank 108. Such a variable characteristic allows the ejector to adjust the overall flow and pressure of the input anode stream presented to the fuel cell stack 106.

System 100 further includes energy storage device 140 configured to utilize or consume a different energy source than fuel cell stack 106. For example, in the following description, energy storage device 140 may be a battery that supplements substantially all fuel cell power during vehicle operation. However, in some instances, energy storage device 140 may also supplement a portion of fuel cell power during vehicle operation. As such, a vehicle with propulsion system such as that shown in FIG. 1 may be referred to as a hybrid fuel cell vehicle, which may be referred to a hybrid electric vehicle. As another example, system 100 may be operated to drive energy storage device 140 which may in turn provide a generator function to convert the output to electrical energy, where the electrical energy may be stored in system 100 for later use. Further embodiments may include one or more rechargeable batteries, fuel cells, and/or capacitors for example. In these examples, electrical energy may be temporarily converted to chemical or potential energy for storage. The vehicle propulsion system may be configured to transition between two or more of the operating modes described above in response to operating conditions. Energy storage device 140 may also periodically receive electrical energy from a power source residing external to the vehicle (e.g. that is not part of the vehicle). As a non-limiting example, the propulsion system of system 100 may be configured as a plug-in hybrid vehicle, whereby electrical energy may be supplied to the energy storage device from a power source via an electrical energy transmission cable. Controller 124 may identify and/or control the amount of electrical energy stored at energy storage device 140, which may be referred to as the state of charge (SOC). As such, it should be appreciated that any suitable approach may be used for recharging energy storage devices from a power source that does not comprise part of the vehicle (e.g., charging via a wire, wireless connection wherein the energy storage device may receive electrical energy from a power source via one or more of electromagnetic induction, radio waves, and/or electromagnetic resonance). Inclusion of an alternative source of energy via energy storage device 140 allows the vehicle to be propelled by utilizing an energy source other than fuel cell stack 106. In this way, the hybrid electric vehicle, as described with reference to the propulsion system of vehicle system 100, may be configured to utilize the secondary form of energy (e.g., electrical energy) to provide power for continuous operation of the vehicle.

With regard to a description of the methods, FIGS. 2-5 are included to illustrate example routines and operating sequences for temporarily reducing a fuel cell power below a requested fuel cell power, supplementing the fuel cell power reduction with battery power, and performing an anode leak tests during the temporarily reduced fuel cell power. As described in greater detail below, one advantage of such a method is that a power demand can be supplied to enable detection of potential leaks during vehicle operation, for example, when a vehicle is operated under a substantially high engine load.

Figure 2:
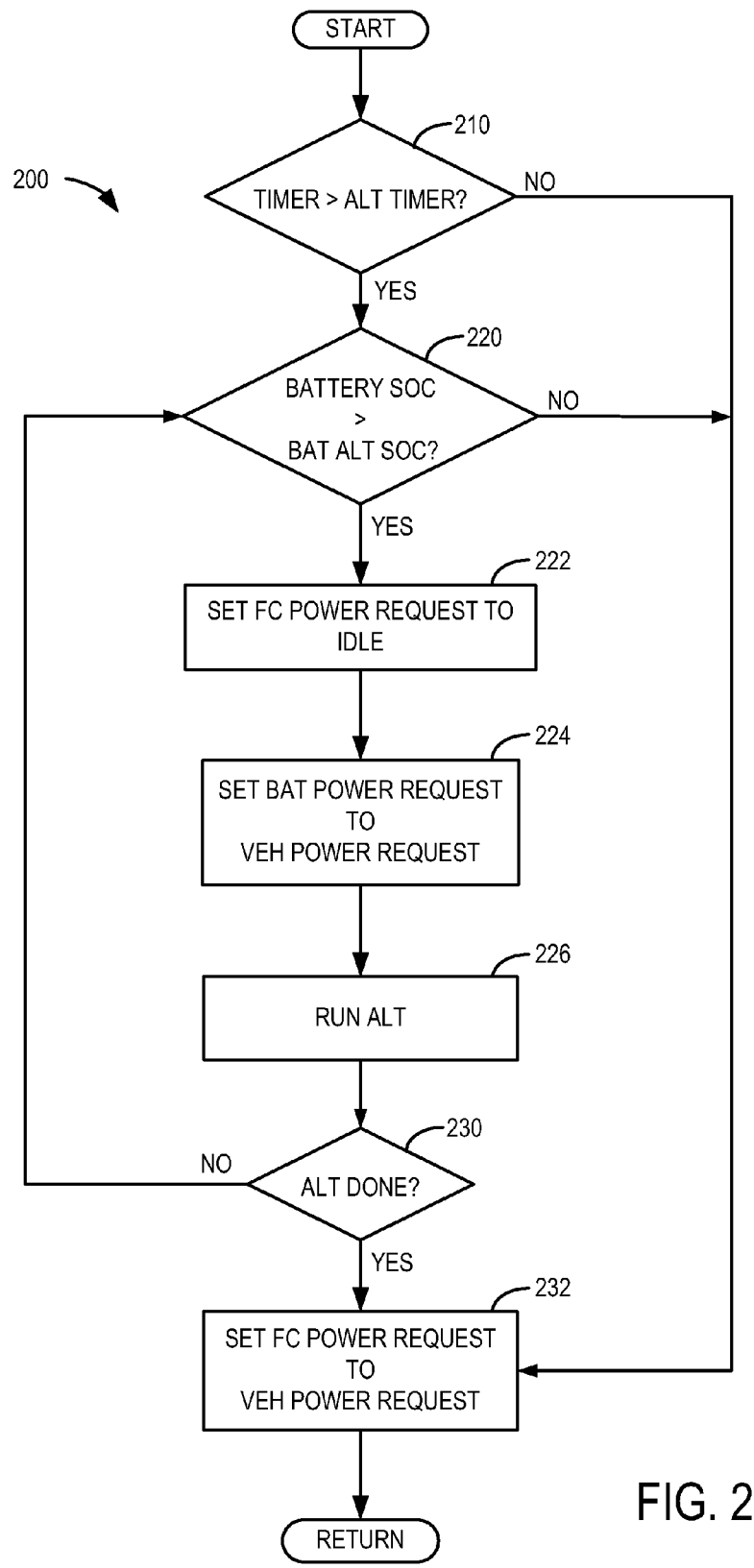
FIG. 2 shows an example flow chart illustrating a routine for temporarily reducing a fuel cell power and supplementing the fuel cell power with battery power according to a first embodiment of the method.

For simplicity, FIG. 2 shows an example flow chart illustrating routine 200 for temporarily reducing the fuel cell power and supplementing the fuel cell power with battery power according to the first embodiment. As noted above, controller 124 may be configured to perform the anode leak test during the temporarily reduced fuel cell power. With this arrangement, the method may determine anode integrity of a hydrogen fuel cell vehicle during vehicle operation. In addition, because the method flexibly allows for test performance during vehicle operation, controller 124 may be further configured to temporarily reduce the fuel cell power responsive to one or more of current driving conditions, a state of charge of the fuel cell, a temperature, and/or a vehicle speed. For this reason, routine 200 is configured with a timer for determining whether a window exists in the engine drive cycle for performing the anode leak test, particularly since the methods allow testing to be performed during vehicle operation when transient conditions naturally occur. At 210, routine 200 includes comparing the window timer to a test timer referred to as an ALT timer that indicates the time duration or length of time of the test. System 100 may thus be configured to estimate whether a sufficient window exists in the engine drive cycle for performing the test. Furthermore, as described in greater detail below, a window size determination may be made based on current operating conditions, e.g., based on a driving profile used to calculate a power demand during operation. Alternatively, if a sufficient window is not identified, controller 124 may continue monitoring one or more parameters to identify a window long enough to allow the leak detection test to be performed. For simplicity, the power demands during such times may be provided by fuel cell stack 106.

Continuing with the description, upon identifying a window of sufficient size or length exists for performing the anode leak test during vehicle operation, at 320, controller 124 may further determine whether energy storage device 140, herein described as a battery, includes sufficient stored energy for supplementing vehicle power while simultaneously performing the leak detection test. As one example, routine 200 may be configured to compare a battery state of charge (SOC) to an amount of energy used when performing the leak test as well as providing vehicle power. Thus, routine 200 may be further configured to estimate a vehicle power required to meet operating demands of the vehicle based on current driving conditions. If the battery has sufficient energy for performing the anode leak test, controller 124 may make one or more adjustments to distribute the power demand to the alternative energy source present onboard the vehicle. Otherwise, if the amount of energy stored by the battery device is not sufficient to perform the test while providing vehicle power, routine 200 may postpone the anode leak test until a window is identified wherein the state of battery charge allows the test to be performed. In this way, routine 200 further includes comparing a vehicle power to a battery state of charge threshold, a vehicle power falling below the battery state of charge threshold indicating that sufficient battery power exists for supplementing the fuel cell power reduction. That is, when battery SOC stored exceeds the power demands of the vehicle for an identified window, the anode leak test may be performed.

At 322, the anode leak test begins when fuel cell power is reduced below the requested amount. For simplicity, routine 200 is described herein with respect to a fuel cell idle, the method according to the first embodiment including reducing fuel cell power to a fuel cell idle while providing vehicle power from an alternate power source (e.g., a battery configured to supply the vehicle with power while determining anode integrity). However, the inventors also contemplate other arrangements and distribution profiles during testing. In this way, methods may also be implemented wherein the fuel cell power is reduced below a requested amount, but does not fall to a fuel cell idle. For example, routine 200 may alternately be configured to make adjustments within system 100 to establish the amount of energy supplied during operation. Controller 124 may then be configured use the set amount of fuel cell energy supplied during operation, for example, by employing a model to estimate the energy distribution employed by the engine, and further estimate whether a leak exists in the anode of the fuel cell stack using the estimated distribution profile. Herein, fuel cell power is reduced to fuel cell idle for simplicity.

At 324, controller 124 may supplement the fuel cell power by setting the battery power as the vehicle power requested while making adjustments to operate the vehicle. In this way, the vehicle power is supplied substantially entirely by battery power while the anode leak test is performed during vehicle operation. Thereafter, the anode leak test is performed, as indicated at 326. At 330, controller 124 may monitor test progress to determine whether the anode leak test has been completed. Upon completion of the anode leak test, at 332, adjustments may be made to restore vehicle operation to the fuel cell stack by setting the fuel cell power to the power requested. Battery power may subsequently be used to supplement the fuel cell power during hybrid vehicle operation. While the anode leak test is being performed, controller 124 may also monitor the state of charge of the battery to ensure that vehicle operation continues while the test is conducted. As one example, a vehicle may desire the full power of the vehicle for safety reasons, e.g., to accelerate rapidly while avoiding a potential traffic accident, which may increase the amount of energy used by the vehicle. In response, the anode leak test may be interrupted and adjustments made (e.g., by redistributing power back to the fuel cell) to meet the increased power demand of the vehicle. Thereafter, the test may be performed at the next available opportunity identified by system 100.

Figure 3:
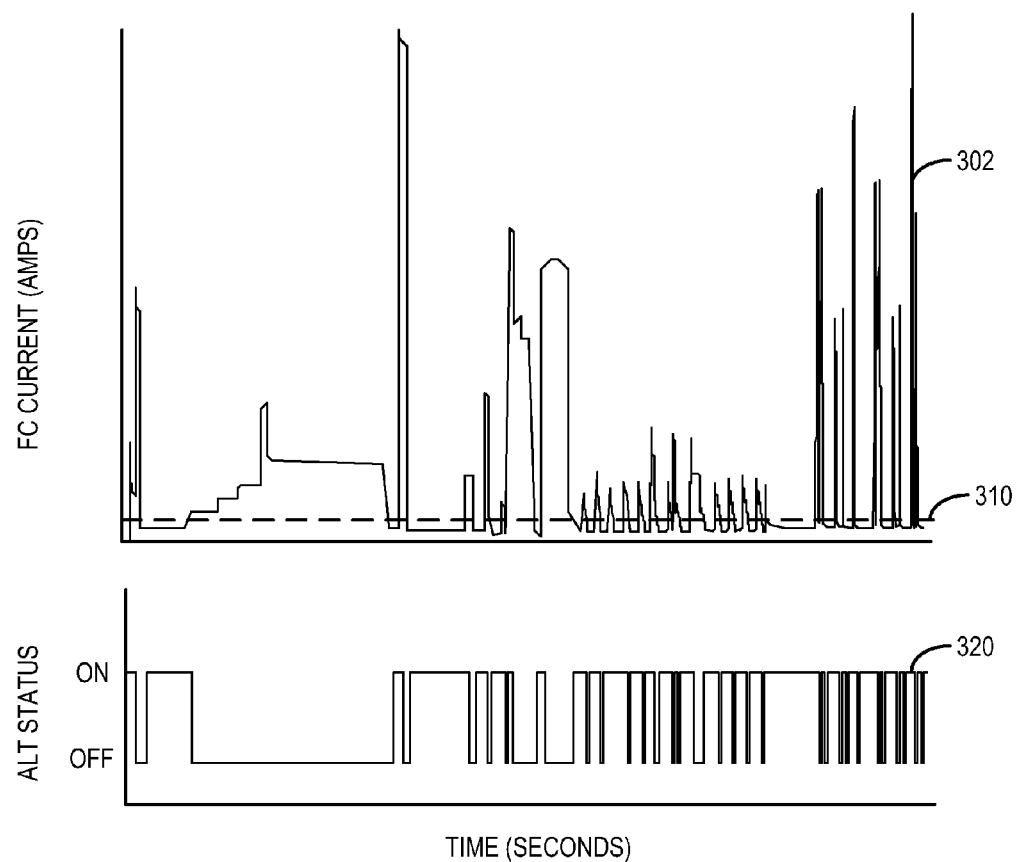
FIG. 3 depicts an example vehicle operating sequence to illustrate a method wherein the anode leak test occurs under fuel cell idle conditions for reference.

For reference, FIG. 3 depicts an example vehicle operating sequence illustrating a method wherein the anode leak test occurs under fuel cell idle conditions. The top figure schematically shows the fuel cell current used to power the vehicle along the y-axis versus time that is shown along the x-axis. Time increases from left to right while fuel cell increases from the bottom to top. The bottom figure shows time periods when the fuel cell current falls below a threshold that indicates low idle fuel cell loads.

During vehicle operation FC current profile 302 shown illustrates an example driving profile with a transient trajectory wherein the fuel cell current used to power the vehicle increases and decreases in proportion to the power demand requested by a vehicle operator. When the power requested falls below fuel cell threshold 310, the anode leak test may be performed. For this reason, ALT status 320 shown in the bottom figure illustrates regions of low idle load when the ALT status has been turned on. One disadvantage of previously implemented methods is that they lack an alternate energy source. Thus, as noted above, lacking an alternative energy source limits performance of anode leak tests since the windows are often short and therefore do not support performing the anode leak test that may include reducing the power of the fuel cell. For this reason, anode leak tests are often performed only during vehicle idle conditions like when a vehicle has stopped at a stoplight, which may lead to infrequent checking for hydrogen leaks in the anode of the fuel cell stack.

Figure 4:
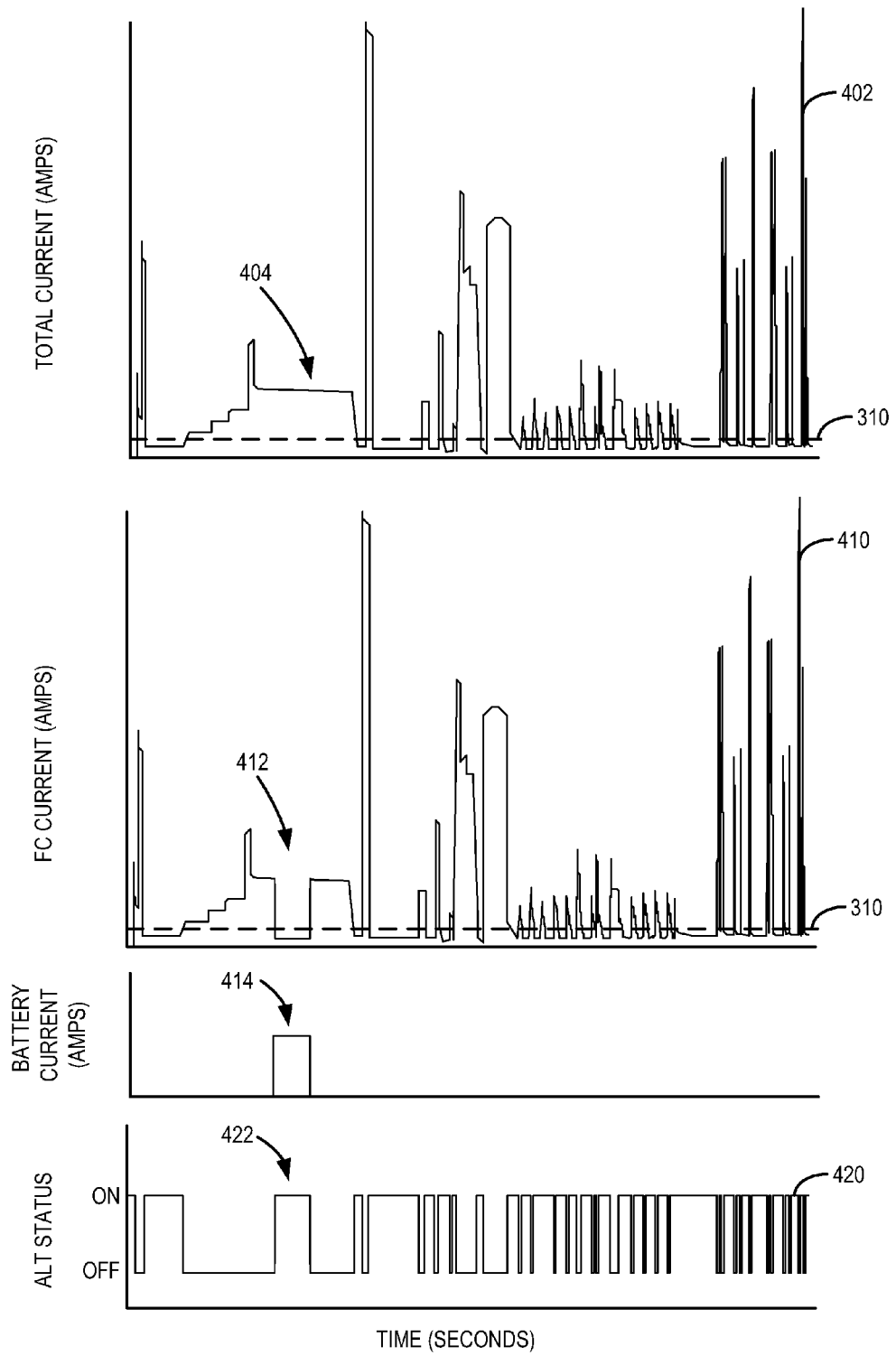
FIG. 4 shows an example vehicle operating sequence in accordance with the first embodiment of the method.

Conversely, FIG. 4 shows an example vehicle operating sequence in accordance with the first embodiment of the method, wherein an alternate power source is included for supplementing vehicle power during operation. Because two sources of energy are present onboard the vehicle, a total current profile is shown in the top figure whereas the second figure schematically shows the fuel cell current used to power the vehicle during operation. Then, the third figure illustrates a profile of the alternate energy source while the bottom figure depicts the ALT status to illustrate how measurement windows may be introduced and/or increased to realize additional possible testing times wherein leak detection tests can be made according to the methods described. Time increases from left to right while current increases from bottom to top.

Compared to FIG. 3, total current profile 402 shown in the top figure follows a similar transient trajectory, but for the total vehicle current rather than the fuel cell current. Then, fuel cell threshold 310 is included to indicate low fuel cell idle loads. Stable region 404 is further identified to identify a region wherein controller 124 may make adjustments to perform the anode leak test. Since the operating conditions are stable in this region, and since the vehicle is being powered by fuel cell stack 106 indicated by FC current profile 410, controller 124 may make one or more adjustments to perform the leak detection test during vehicle operation.

For example, as described above with respect to routine 200 of FIG. 2, controller 124 may set the fuel cell power to idle as shown at region 412. That is, the profiles shown illustrate how the vehicle power can be redistributed from the fuel cell to the battery in the third figure as long as the battery supply has sufficient energy charge stored to provide for vehicle operation and testing procedures during this time period. Distribution of power to the battery then allows power to be supplied from the battery in the same region indicated at 414. For simplicity, FIG. 4 shows the battery current to illustrate that power comes from the battery during the anode leak test. Although not shown in the figure, battery usage may decrease the amount of charge stored within the energy storage device. The bottom figure illustrates ALT status 420, and particularly, how a vehicle configured to carry out the method creates extra testing opportunities for identifying anode integrity. As such, at 422, the ALT status is set to on to accommodate an extra testing period. Although the ALT status has been set to on, controller 124 may determine whether an anode leak test is to be performed during this extra testing period. In other words, ALT status 420 indicates a window wherein performing the leak detection test is possible, but does not necessarily indicate that a leak test is actually performed. In this way, the leak detection test may be performed in some windows and not others, or may be performed during a window early in the driving profiles shown and then scheduled for a future time period, which allows for more frequent leak detection testing.

Figure 5:
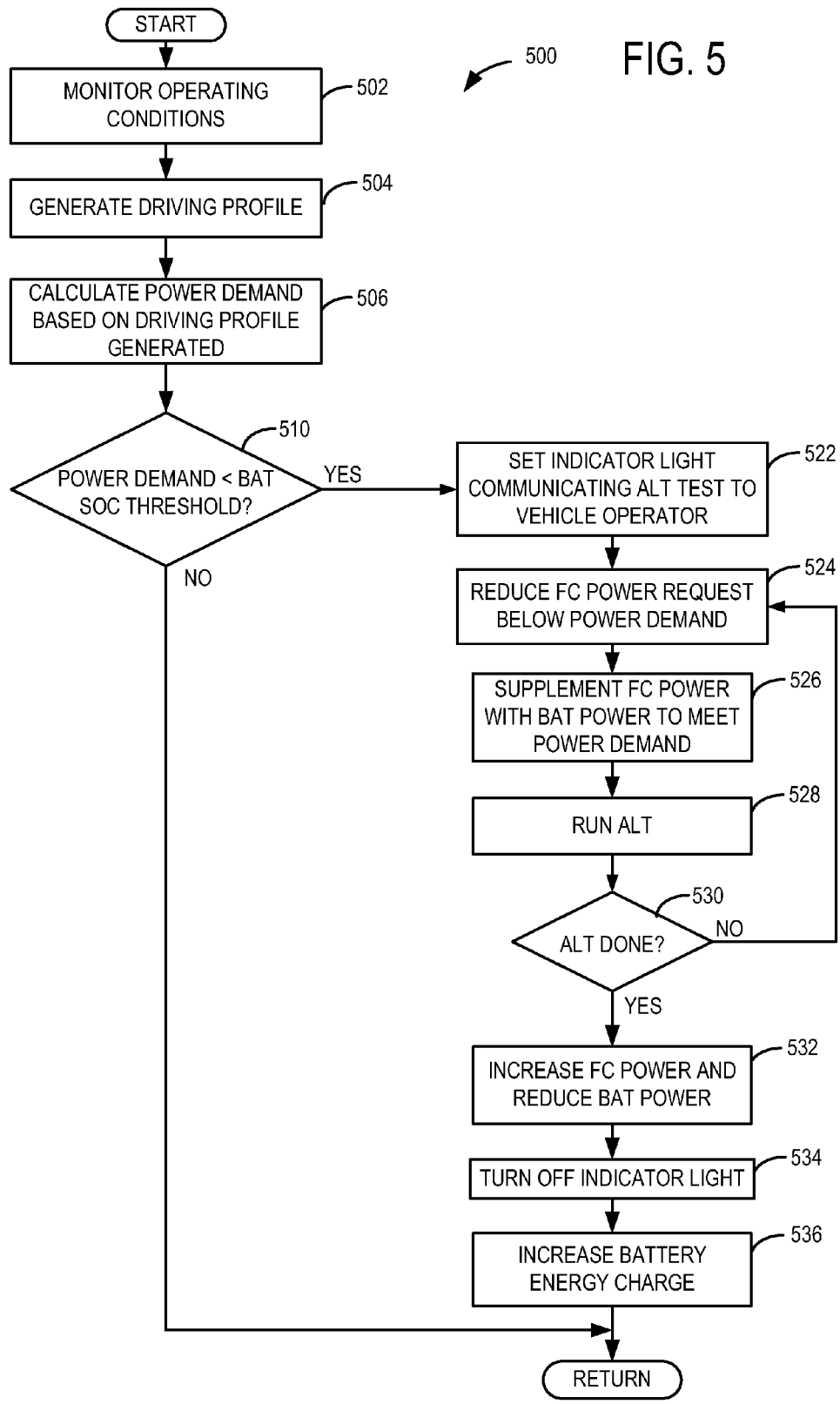
FIG. 5 shows an example flow chart illustrating a routine according to a second embodiment of the method.

FIG. 5 shows an example flow chart illustrating method 500 that is a routine according to a second embodiment of the method. In the second embodiment, controller 124 may be configured to monitor vehicle conditions to determine whether a leak test is to be performed. For example, system 100 may be configured to monitor a driving profile used to calculate a power demand during vehicle operation (e.g., the power demand is calculated based on the driving profile). Then, responsive to an additional testing opportunity, the method further includes communicating the anode leak test to a vehicle operator during vehicle operation. As described in greater detail above, an anode leak test is performed to determine an anode integrity, the anode leak test performed while the vehicle is driven. The method further includes increasing the state of charge of the battery during vehicle operation, for example, by recharging the energy storage device.

At 502, method 500 includes monitoring engine operating conditions during vehicle operation. Then, during operation, at 504, the method includes generating a driving profile based on the current driving conditions. For example, controller 124 may be configured to generate one or more of the profiles shown in FIG. 4 during operation. Then, based on the driving profiles generated, controller 124 may be further configured to calculate a vehicle power demand based on the driving profile generated and engine conditions identified, as shown at box 506. If the power demand requested falls below the state of charge of the battery indicated by an SOC threshold, at 510, method 500 includes determining whether the current operating conditions support performing the anode leak test in addition to operating the vehicle. Said differently, performance of the anode leak test is performed based on a driving profile that is used to determine whether a state of charge of the battery exceeds a power demand, or requested vehicle power. If an anode leak test is to be performed, the method continues while making adjustments to support conducting the test, otherwise, vehicle operation continues while one or more engine conditions are monitored during operation.

According to the second embodiment, the leak test begins by setting an indicator light communicating the ALT test to a vehicle operator, as shown at 522. Then, at 524, the fuel cell power is reduced below the calculated power demand, which is an amount of power requested by a vehicle operator. At 526, the reduced fuel cell power is supplemented with battery power to meet the calculated power demand, which allows the anode leak test to be performed, as indicated at 528. As described above with respect to the first embodiment, at 530, controller 124 may be configured to monitor test progress to determine whether the anode leak test has been completed. Upon completion of the anode leak test, at 532, adjustments may be made to restore vehicle operation to the fuel cell stack by setting the fuel cell power to the power requested by the vehicle. In this way, a requested fuel cell power is increased to meet operating demands subsequent to the anode leak test, the fuel cell power providing at least a portion of the vehicle power. Thereafter, the indicator light that communicates the anode leak test to a vehicle operator may be turned off as vehicle operation is continued, as shown at 534. Although the second embodiment is described with respect to a light that communicates test conductanced, the method may alternatively or additionally communicate the leak detection test and/or test results via another communication means. For example, controller 124 may be configured to wirelessly send test results of probing for leak detection to an account associated with the vehicle or a vehicle operator. This may enable a performance profile of the fuel cell recirculation system to be generated and/or monitored to determine whether anode degradation has occurred. Although, battery power may subsequently be used to supplement the fuel cell power during hybrid vehicle operation, at 536, system 100 may be configured to recharge or increase the stored energy of the battery during operation. In other words, method 500 further comprises increasing the state of charge of the hybrid battery while vehicle power is provided by fuel cell power, for example using a generator onboard the vehicle (not shown). With this arrangement, the system described is continually prepared to perform the leak detection test during vehicle operation.

As described, the methods allow for detecting a leak in a hydrogen fuel cell vehicle while driving. The methods may comprise reducing a requested fuel cell power to a fuel cell idle while simultaneously providing power from a hybrid battery, and performing an anode leak test to identify the leak. The method further comprises comparing a state of energy charge of the hybrid battery to a charge threshold, wherein a state of the energy charge exceeding the charge threshold indicates sufficient battery power exists for performing the anode leak test, the battery power providing supplementary power to the reduced fuel cell power and the hybrid battery powering vehicle driving while the anode leak test is simultaneously performed. As described in greater detail below, the methods may further comprise comparing a time duration of the anode leak test to a time threshold to identify the presence of a leak. That is, the time during which supplementary power is supplied by the alternate energy source to power the vehicle may be sufficiently long based on pressurizing within the system. When this occurs and the time to reach a pressure setting during leak detection testing is substantially long enough that the battery is unable to supply power to the vehicle for the entire period, the system may instead trigger a warning indicator that communicates the a testing duration has been exceeded and to have the vehicle evaluated by a technician trained to identify leaks or degradation present within the system. The system may alternatively be configured to monitor the state of charge of the hybrid battery and trigger the warning when the state of charge falls below a threshold used to indicate that battery power is insufficient to continue the testing procedure. Because, the method further comprises calculating a power demand based on a driving profile in some instances, the driving profile can be compared to a state of energy charge of the hybrid battery such that the anode leak test is performed only when the power demand falls below the state of energy charge of the hybrid battery, since the battery power may comprise substantially all of the power supplied to operate the vehicle during testing.

Turning to a description of the anode leak tests performed according to the methods, U.S. Pat. No. 7,942,035 titled "ANODE LEAK TEST IMPLEMENTATION," herein incorporated by reference, is further included to illustrate an exemplary leak detection method that may be performed to determine anode integrity. As described there, and reproduced herein, system 100 utilizes a series of anode leak tests that are generally performed when the load on the fuel cell stack 106 is stable. However, because the methods described include an alternative energy source to supplement fuel cell power, the tests may be performed on system 100 during vehicle operation rather than at low fuel cell idle loads, which extends the utility over previous anode leak detection systems that conduct tests when driver demand is low.

In a first level anode leak test, the controller 124 determines whether the fuel cell stack 106 has been reduced below a requested power that in one example is a fuel cell idle state based on the amount of current generated by the fuel cell stack 106. In response to determining that the fuel cell stack 106 is in the idle state, controller 124 controls the pressure regulator device 112 to control the pressure of the input anode stream at a first pre-selected pressure level in response to various control values. As noted above, such control value or values may be PWM-based, analog, or digital. The pressure sensor 125 transmits the actual pressure amount on the signal PRESSURE back to the controller 124 to determine if the actual pressure amount is equivalent to the first pre-selected pressure level. The controller 124 measures and records the values associated with driving the pressure regulator device 112 to determine if such values are equal to predetermined control value(s). In the event the control values are not equal to first predetermined control values the controller 124 may run a second level anode test in response to the fuel cell stack 106 being in an idle state.

The second level anode test may be similar to the first level anode test with the exception of the use of a second pre-selected pressure level being utilized instead of the first pre-selected pressure level. In addition, second predetermined value(s) are established to correspond to the second pre-selected pressure level. The second pre-selected pressure level may correspond to a higher pressure level than that of the first pre-selected pressure level. The first and second level anode leak test are discussed in more detail in connection with FIGS. 6 and 7. Prior to performing the first and second level anode leak tests, the system 100 is calibrated to define the predetermined control ranges for the first and second pre-selected pressure levels, respectively. Such a calibration may be performed at an end-of-line (EOL) test while the vehicle is being produced or manufactured.

Figure 6:
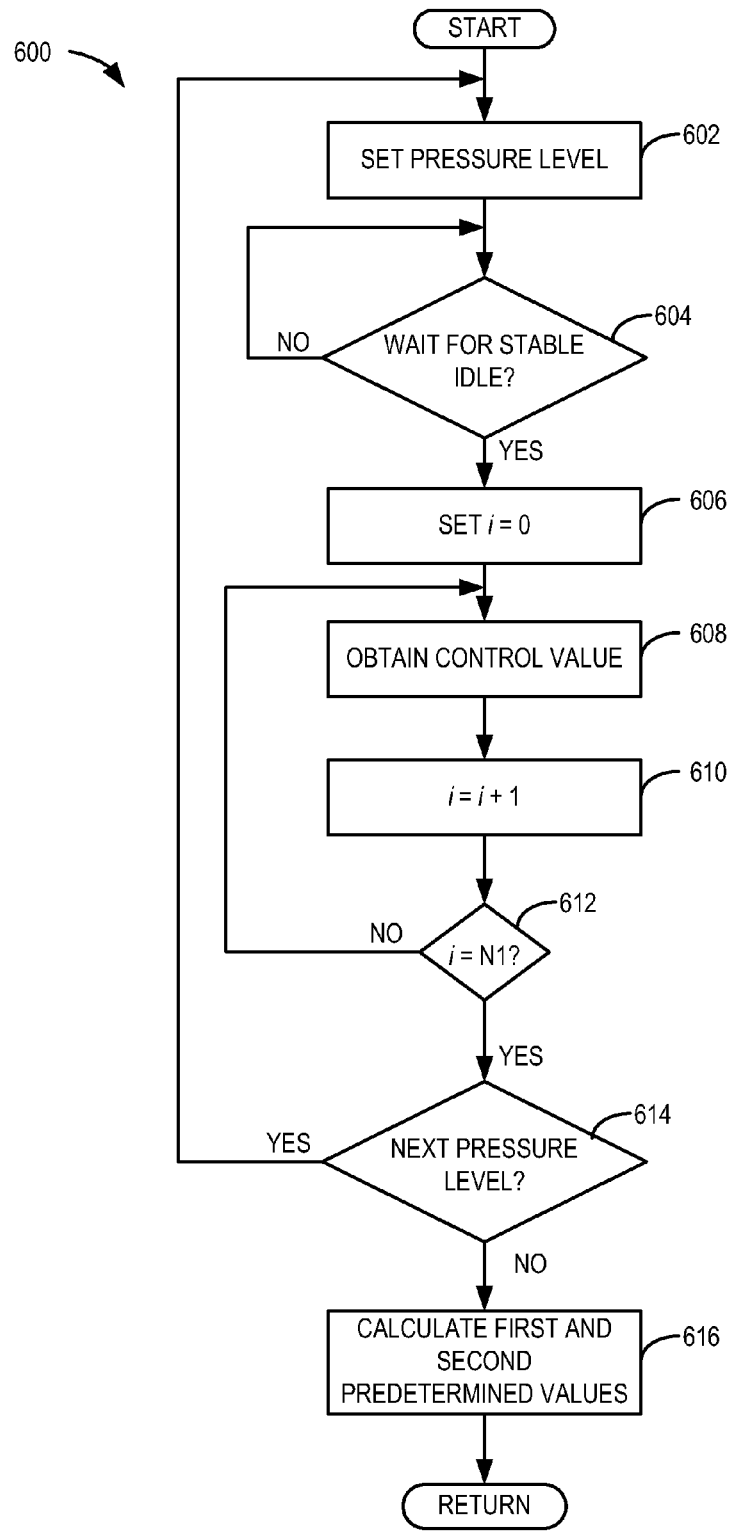
FIG. 6 illustrates a block diagram from establishing first and second predetermined pulse width modulated values as used in accordance with first and second level anode leak tests.

FIG. 6 illustrates a block diagram 600 for establishing first and second predetermined control value(s) as used in accordance with the first and second level anode leak tests, respectively.

In block 602, the pressure regulator device 112 is controlled (via the controller 124 with the control values) to distribute hydrogen (e.g., in the input anode stream) to the first pre-selected pressure level. The first pre-selected pressure level generally corresponds to a low pressure level. The first pre-selected pressure level may correspond to the pressure difference between the anode and cathode.

In block 604, the current sensor 122 measures the amount of current generated by the fuel cell stack 106 to determine if the stack current is equal to a predetermined amount of current which generally corresponds to the fuel cell stack 106 being in an idle state. In one example, a stack current of 3 A may correspond to the fuel cell stack 106 being in the idle state. The particular amount of stack current used to indicate whether the fuel cell stack 106 is in the idle state may vary based on the type of fuel cell stack implemented, various vehicle loads, and other system-to-system variations. If the measured stack current is not equal to the predetermined amount of current, then the diagram 600 remains in the block 604 until the predetermined amount of current is achieved. If the measured stack current is equal to the predetermined amount of current, then the diagram 600 moves to block 606.

In block 606, a counter variable (e.g., i) is initialized.

In block 608, the controller 124 obtains the corresponding control value that is being used to drive the pressure regulator device 112 in order to achieve the first pre-selected pressure level attained in block 602. The controller 124 stores the control value in volatile memory.

In block 610, the counter variable i is incremented in response to storing the control value.

In block 612, the diagram 600 determines whether the counter value i is equal to a predetermined sample size (e.g., N1). Generally speaking, the system 100 experiences noise which may cause a number of control values to be measured while the first pre-selected pressure level is attained. Due to such a condition, N1 is selected to achieve a sample size that ensures a high degree of confidence. In one example, N1 may correspond to a sample size of 120 measurements of control values that are used to achieve the first pre-selected pressure level. The sample size may vary based on the desired criteria of a particular implementation. If i is equal to N1, then the diagram 600 moves to block 614. If i is not equal to N1, then the diagram 600 moves back to block 608 to obtain additional measurements.

In block 614, a determination is made whether to control the pressure regulator device 112 via the controller 124 with another set of control values to distribute hydrogen in the input anode stream at the second pre-selected pressure level. The second pre-selected pressure level is set to a pressure that is greater than the first pre-selected pressure level. If the second pre-selected pressure level has not been established, the diagram 600 moves back to block 602. If the second pre-selected pressure level has been established, the method 600 moves to block 616.

In block 616, the controller 124 determines the first predetermined values and stores the first predetermined values in non-volatile memory (e.g., EEPROM). In one example, the first predetermined values may correspond to a range of measured control values to achieve the first pre-selected pressure level. Such a range may include the sample size N1. As noted above, in one example, the sample size may include 120 control value measurements. In such a case, a range of 120 control values may be stored in non-volatile memory. In yet another example, the controller 124 may calculate an average and standard deviation of the measurements which comprise the sample size N1. In such an example, the average and/or the standard deviation may be defined as first predetermined value(s).

Block 602 is re-executed to establish the second pre-selected pressure level. In block 602, the pressure regulator device 112 is controlled (via the controller 124 with control values) to distribute hydrogen at the second pre-selected pressure level.

Block 604 is re-executed to determine if the stack current is equal to a predetermined amount of current which generally corresponds to the fuel cell stack 106 being in an idle state. If the measured stack current is not equal to the predetermined amount of current, then the diagram 600 remains in the block 604 until the predetermined amount of current is achieved. If the measured stack current is equal to the predetermined amount of current, then the diagram 600 moves to block 606.

Block 606 is re-executed to re-initialize i.

Block 608 is re-executed so that the controller 124 obtains the corresponding control value that is being used to drive the pressure regulator device 112 to achieve the second pre-selected pressure level attained in the re-executed block 602. The controller 124 stores the corresponding control value in volatile memory.

Block 610 is re-executed to increase i in response to storing the control value.

Block 612 is re-executed to determine whether the counter value i is equal to N1. As noted above, the system 100 experiences noise which may necessitate for a number of control values to be measured while the second pre-selected pressure level is attained. Due to such a condition, N1 is selected to achieve a sample size that is sufficient to establish a high degree of confidence. If i is not equal to N1, then the diagram 600 moves back to block 608 to obtain additional measurements.

Block 614 is re-executed to determine if the second pre-selected pressure level control value has been established. The diagram moves to block 616.

In block 616, the controller 124 determines the second predetermined values and stores the second predetermined values in non-volatile memory. In one example, the second predetermined control values may correspond to a range of measured control values to achieve the second pre-selected pressure level. Such a range may include the sample size N1. As noted above, in one example, the sample size may include 120 control value measurements. In such a case, a range of 120 control values may be stored in non-volatile memory. In yet another example, the controller 124 may calculate an average and standard deviation of the measurements which comprise the sample size N1. In such a case, the average and/or the standard deviation may be defined as first predetermined value(s).

Figure 7:
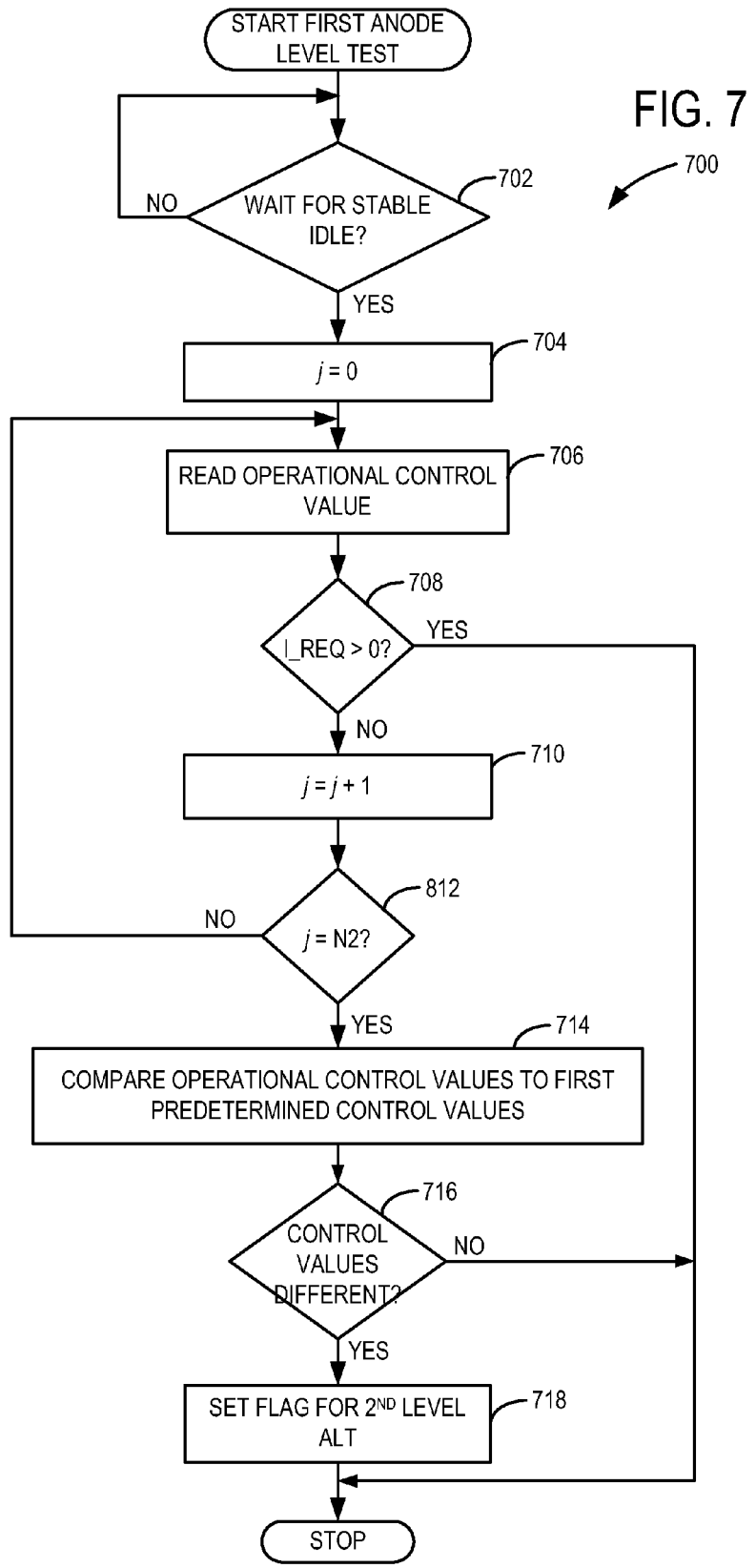
FIG. 7 illustrates a block diagram for performing a first level anode leak test.

FIG. 7 illustrates a block diagram 700 for performing the first level anode leak test. In block 702, the current sensor 122 measures the amount of current generated by the fuel cell stack 106 to determine if the stack current is equal to the predetermined amount of current. Such a condition is indicative of whether the fuel cell stack 106 has been reduced to the idle or stable state. If the measured stack current is not equal to the predetermined amount of current, then the first anode leak test may not be performed. If the measured stack current is equal to the predetermined amount of current, then the diagram 700 moves to block 704.

In block 704, a counter variable (e.g., j) is initialized.

In block 706, the controller 124 reads and stores a particular operational control value that is being used to drive the pressure regulator device 112 to adjust the pressure of the input anode stream to reach the first pre-selected pressure level.

In block 708, the controller 124 determines whether the fuel cell stack 106 is coming out of the idle state. For example, the controller 124 may assess the current readings being transmitted by the current sensor or read message activity on a multiplexed bus protocol (e.g., a control area network (CAN)) to determine what the driver is demanding (e.g., throttle position, brake position, etc.). In the event the fuel cell stack 106 comes out of the idle state, the diagram 600 ceases to perform the first anode level test and suspends performance of the test.

In block 710 j is incremented.

In block 712, the diagram 700 determines whether the counter variable j is equal to a predetermined sample size (e.g., N2). As noted above, it may be necessary for the controller 124 to obtain multiple readings of the control values based on the desired confidence level in view of noise considerations. If the counter variable j is equal to N2, then the diagram 700 moves to block 714. If the counter variable j is not equal to N2, then the diagram 700 moves back to block 706. In general, it may take seconds for blocks 706, 708, 710 and 712 to be executed (e.g., 5 seconds may correspond to the amount of time needed to obtain the PWM value measurements). The particular amount of time to execute blocks 706, 708, 710 and 712 may vary depending on controller design, software and the desired amount of test confidence.

In block 714, the controller 124 compares the operational control values that were stored or measured from block 706 to the first predetermined control values as established in the diagram 600. For example, the controller 124 may compare the operational control values of block 706 to the first predetermined control values (e.g., the entire set of 120 measurements of the first predetermined control values as obtained in block 616). In such an example, a two sample t test may be performed to compare the entire set of operational control values of block 706 to the entire set of the first predetermined control values. In general, the two sample t test may be employed to determine whether the two sets of data are equal to each other. The two sample t test is set forth in "STATISTICS FOR ENGINEERING AND SCIENCE" by W. Mendenhall and T. Sincich, fourth edition, p. 422-494, which is hereby incorporated by reference. In the event, the first predetermined control values are represented by the average and/or the standard deviation of the sample size N1 as noted in connection with FIG. 6, the controller 124 may perform a one sample t test. The one sample t test is also set forth in "STATISTICS FOR ENGINEERING AND SCIENCE" by W. Mendenhall and T. Sincich as set forth above. The controller 124 performs the one sample t test by comparing all of the measure values which comprise the sample size N2 to the average and the standard deviation.

In block 766, the controller 124 determines whether the stored operational control values of block 706 are equal to the first predetermined control values. If the stored operational control values of block 706 are not equal to the second predetermined control values, the diagram 700 moves to block 718. If the stored operational control values of block 706 are equal to the first predetermined control values, the diagram 700 moves to block 702. It is appreciated that the controller 124 employs a number of statistically based methods to determine if the values are equal or not equal to each other. For example, the values may be statistically equal to each other to be deemed equal. Likewise, in the event the values are not within some pre-defined statistical range, the values may not be considered equal.

In block 718, the controller 124 sets a flag to indicate that the second anode leak test is to be performed.

In general, if the stored operational control values of block 706 are different from the first predetermined control values, such a condition may be indicative of an anode leak in the system 100. For example, a leak may be inferred since the controller 124 may have to drive the pressure regulator device 112 at operational control values that are different than the control values used to establish the first predetermined control values in order to achieve the first pre-selected pressure level. The operational control values needed to maintain the pressure of the hydrogen at the first pre-selected pressure level becomes distinguishable as an error state or indicator in the event such control values are not equal to the first predetermined control values.

Figure 8:
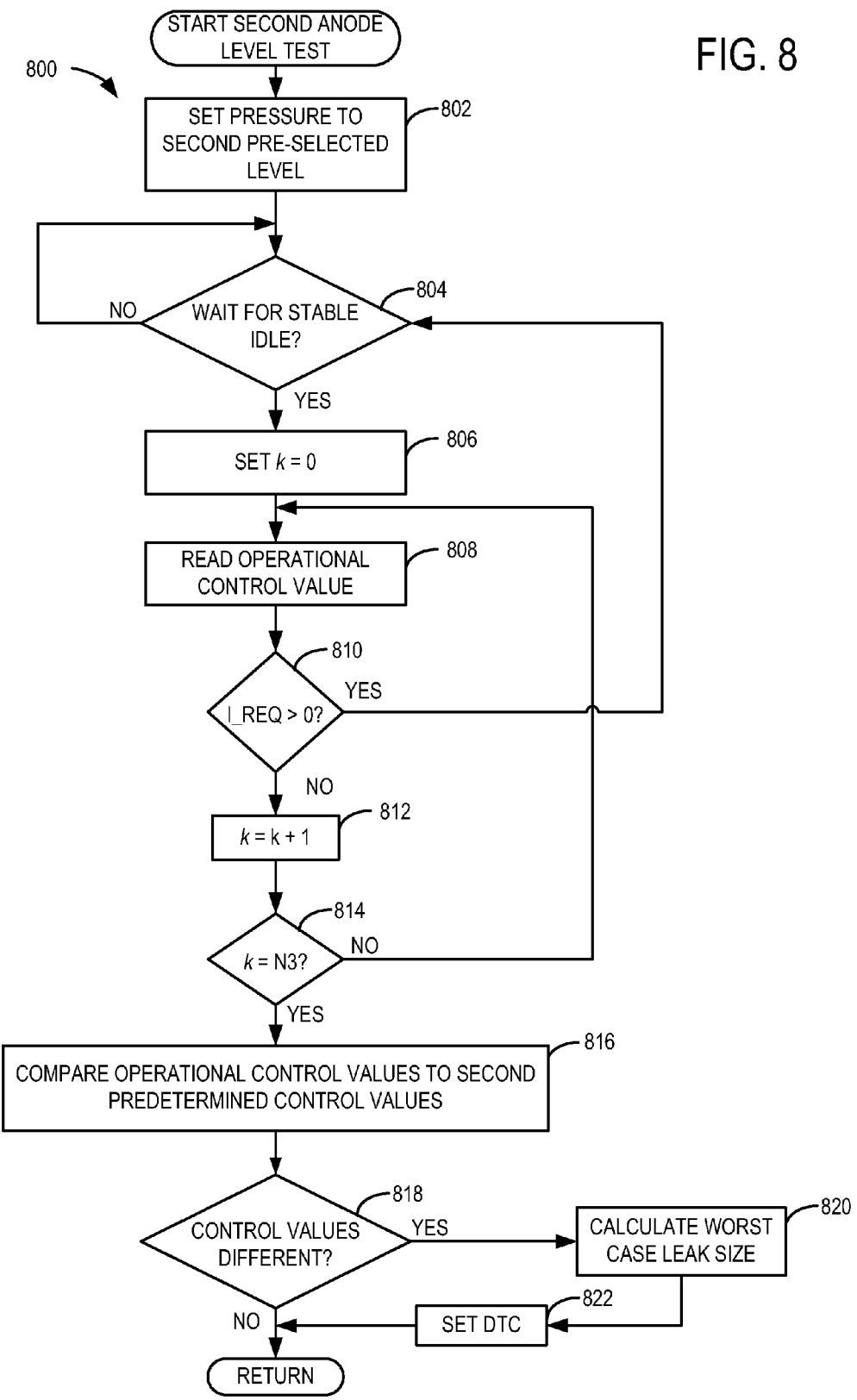
FIG. 8 illustrates a block diagram from performing a second level anode leak test.

FIG. 8 illustrates a block diagram 800 for performing the second level anode leak test. The second level anode leak test is generally performed when the controller 124 sets the flag indicating that the operational control values do not fall within the first predetermined value range as noted in diagram 700.

In block 802, the controller 124 controls the pressure regulator device 112 to adjust the pressure of the hydrogen in the input anode stream to the second pre-selected pressure level.

In block 804, the current sensor 122 measures the amount of current generated by the fuel cell stack 106 to determine if the stack current has been reduced to the predetermined amount of current. If the measured stack current has not been reduced to the predetermined amount of current, then the diagram 800 waits for the fuel cell stack 106 to enter into the idle state. If the measured stack current has been reduced to the predetermined amount of current, then the diagram 800 moves to block 806.

In block 806, a counter variable (e.g., k) is initialized.

In block 808, the controller 124 reads and stores the particular operational control value that is being used to drive the pressure regulator device 112 to adjust the pressure of the input anode stream to reach the second pre-selected pressure level.

In block 810, the controller 124 determines whether the fuel cell stack 106 is coming out of the idle state. In the event the fuel cell stack 106 comes out of the idle state, the diagram 800 moves to the block 804. In the event the fuel cell stack 106 remains in the idle state, the diagram 800 moves to block 812.

In block 812, the counter variable k is incremented.

In block 814, the diagram 800 determines whether the counter variable k is equal to a predetermined sample size (e.g., N3). If k is equal to N3, then the diagram 800 moves to block 816. If k is not equal to N3, then the diagram 800 moves back to block 808.

In block 816, the controller 124 compares the operational control values that were stored or measured in block 808 to the second predetermined control values as established in the diagram 600. The controller 124 compares the operational control values of block 808 to the second predetermined control values in a similar manner as disclosed in block 714.

In block 818, the controller 124 determines whether the stored operational control values of block 818 are equal to the second predetermined control values. If the stored operational control values of block 808 are not equal to the second predetermined control values, the diagram 800 moves to block 820. If the stored operational control values of block 808 are equal to the second predetermined control values, the diagram 800 moves to block 824. As noted above, the controller 124 may employ any number of statistically based methods to determine if the values are equal or not equal to each other. For example, the values may be statistically equal to each other to be deemed equal. Likewise, in the event the values are not within some pre-defined statistical range, the values may not be considered equal.

In block 820, the controller 124 calculates the worst case leak size. For example, the controller 124 may calculate the worst case leak size based on f(PRESSURE, control input, and operating system parameters), function f depends on system and controller design. In one example, function f may be described as:

$$\text{Leak Size} = \frac{-a + bP_{H_2 Supply} + c(\mu)}{P_{anode} - P_{out}} \quad (1)$$

where $P_{out}$ denotes the pressure at the exit of the leak (cathode or ambient), $p_{H_2 supply}$ denotes the incoming pressure, and $P_{anode}$ denotes the pressure on the signal PRESSURE, u corresponds to the one or more of the operational control values acquired in block 808, and parameter a, b, and c are variables which depend on system architecture and/or other such design criteria associated with the fuel cell stack 106. The diagram 700 contemplates that the block 820 may also be performed in place of block 718 in the event the diagram 800 is not implemented.

In block 822, the controller 124 sets a diagnostic trouble code which may be retrieved by a service tool.

In block 824, the diagram 800 exits out of the second anode leak test.

The first and second anode leak tests as disclosed adds flexibility in timing while being performed in that such tests are non-intrusive and are transparent to the driver or user. Additionally, the first and second anode leak tests do not negatively affect the performance of the fuel cell stack system 100 since battery power supplements the reduced fuel cell power during the anode lead tests. The system 100 generally contemplates that the first anode leak test may be performed to detect the presence of an anode leak without performing the second anode leak test. The second anode leak test is performed at the second pre-selected pressure level that is higher than the first pre-selected test (e.g., at a high resolution) to confirm the findings of the first anode leak test. The first and/or second anode leak tests may be applied to a fuel cell apparatus that is generally situated to generate power in response to electrochemically converting hydrogen from the anode side and oxygen from the cathode side.

Figure 9:
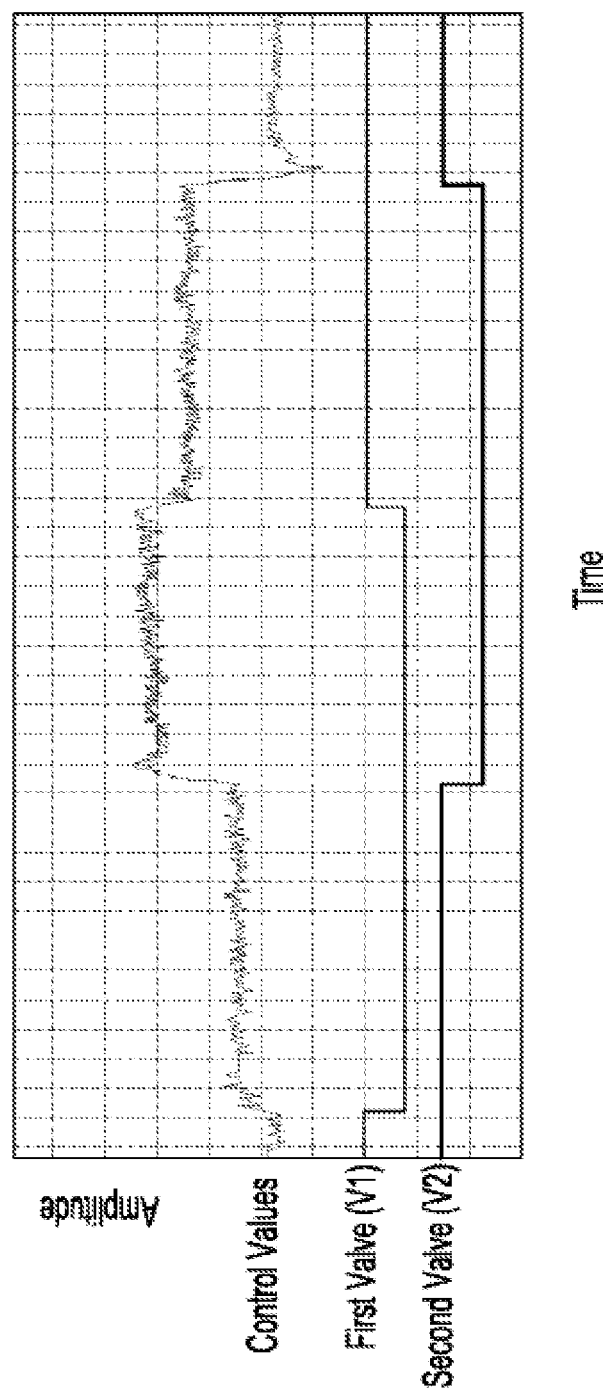
FIG. 9 is a plot depicting the state of a control signal as the fuel cell stack system of FIG. 1 undergoes one or more leaks.

FIG. 9 is a plot depicting the state of the control signal as the fuel cell stack system 100 undergoes one or more leaks. A Design of Experiment (DOE) was conducted to illustrate the manner in which the control values may be used as an error state indicator in the event of hydrogen leaks in the system 100. A first valve V1 and a second valve V2 were installed in the system 100 to simulate hydrogen leaks. The first valve V1 enables a leak between hydrogen pressurized anode and the second valve V2 enables a controlled leak from anode to ambient. At the zero reference point of the plot, both the first valve V1 and the second valve V2 are closed. Further down the x-axis, the first valve V1 is opened while the second valve V2 remains closed. As shown, the control values increase in response to the first valve V1 opening. The plot illustrates that as both valves V1 and V2 are open, the control values increase over the previous state in which only the first valve V1 was open. The DOE establishes that monitoring the state of the control values may serve as a beneficial indicator in detecting the pressure of leaks regardless of the severity of the leak and that the system 100 and the first and second anode leak tests as disclosed above are generally configured to detect hydrogen leaks in the event hydrogen leaks into the air pressurized cathode or into the atmosphere (or ambient).

In this way, the methods advantageously allow an anode leak test to be performed during vehicle operation, for example, when the vehicle is being driven down the highway. Because an alternative energy source is included to provide supplementary power, the method comprises temporarily reducing fuel cell power below a requested fuel cell power; supplementing the fuel cell power reduction with battery power; and performing the anode leak test during the temporarily reduced fuel cell power. Moreover, because the method includes using an alternative energy source to supplement the fuel cell power, the leak detection method can be advantageously triggered based on one or more operating conditions like a driving profile, a state of system control, a temperature, and/or an engine load (e.g., a vehicle speed). For this reason, the controller within the example vehicle described may be configured to calculate a power demand based on, e.g., a current driving profile, in addition to being configured to make one or more adjustments to carry out the anode leak tests. With this arrangement, leak detection can be executed seamlessly during operation, which allows for more frequent checking of leaks in the hydrogen fuel cell vehicle.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
in response to a determined driving profile,
temporarily reducing fuel cell power below a requested fuel cell power;
supplementing the fuel cell power reduction with battery power; and
performing an anode leak test during the temporarily reduced fuel cell power.

2. The method of claim 1, wherein the fuel cell power is temporarily reduced further in response to one or more of current driving conditions, a state of control of the fuel cell, a temperature, and a vehicle speed, and wherein the temporary reduction occurs while supplementing the fuel cell power with battery power and performing the anode leak test.

3. The method of claim 2, further comprising estimating a vehicle power required to meet operating demands based on the current driving conditions.

4. The method of claim 3, wherein the temporarily reducing of the fuel cell power is performed further in response to a vehicle power falling below a battery state of charge threshold.

5. The method of claim 4, wherein the fuel cell power is reduced to a fuel cell idle during the temporarily reduced fuel cell power.

6. The method of claim 5, wherein the supplementing the fuel cell power with battery power includes supplying substantially all vehicle power with battery power, the anode leak test being performed during vehicle operation.

7. The method of claim 6, further including communicating the anode leak test to a vehicle operator during vehicle operation.

8. The method of claim 7, wherein a requested fuel cell power to meet operating demands is increased subsequent to the anode leak test, the fuel cell power providing at least a portion of the vehicle power.

9. The method of claim 8, further comprising increasing the state of battery charge during vehicle operation.

10. A method, comprising:
reducing a fuel cell power down to a fuel cell idle while providing vehicle power from an alternate power source and determining anode integrity of a hydrogen fuel cell during vehicle traveling operation;
wherein determining anode integrity includes operating the anode at a first pressure and a second pressure different from the first pressure.

11. The method of claim 10, wherein the alternate power source is a battery configured to supply the vehicle with power while anode integrity is determined, and wherein the vehicle traveling operation includes vehicle acceleration.

12. The method of claim 11, further comprising performing an anode leak test to determine the anode integrity, the anode leak test performed while a vehicle is being driven.

13. The method of claim 12, wherein performance of the anode leak test is based on a driving profile that is used to determine whether a state of charge of the battery exceeds a power demand.

14. The method of claim 13, wherein the power demand is calculated based on the driving profile.

15. A method for detecting a leak in a hydrogen fuel cell vehicle while driving, comprising:
in response to a determined driving profile,
reducing a requested fuel cell power to a fuel cell idle while simultaneously providing power from a hybrid battery, and
performing an anode leak test to identify the leak.

16. The method of claim 15, further comprising comparing a state of charge of the hybrid battery to a charge threshold, wherein the reducing and the performing are carried out responsive to the state of the charge exceeding the charge threshold.

17. The method of claim 16, wherein battery power provided supplements the reduced fuel cell power during the anode leak test.

18. The method of claim 17, further comprising comparing a time duration of the anode leak test to a time threshold to identify a leak presence.

19. The method of claim 15, further comprising calculating a power demand based on the driving profile, comparing the power demand to a state of charge of the hybrid battery, and performing the anode leak test only when the power demand falls below the state of charge of the hybrid battery.

20. The method of claim 16, further comprising increasing the state of charge of the hybrid battery while vehicle power is provided by fuel cell power.

* * * * *